United States Patent
Kim et al.

(10) Patent No.: US 11,815,165 B2
(45) Date of Patent: Nov. 14, 2023

(54) POWERTRAIN FOR ELECTRIC VEHICLE

(71) Applicants: HYUNDAI MOTOR COMPANY, Seoul (KR); KIA CORPORATION, Seoul (KR)

(72) Inventors: Jin Ho Kim, Suwon-si (KR); Jae Joon Lee, Anyang-si (KR); Jong Sool Park, Hwaseong-si (KR); Jin Young Hwang, Yongin-si (KR); Jong Sung Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/531,434

(22) Filed: Nov. 19, 2021

(65) Prior Publication Data
US 2022/0074472 A1    Mar. 10, 2022

Related U.S. Application Data

(62) Division of application No. 16/887,267, filed on May 29, 2020, now Pat. No. 11,181,174.

(30) Foreign Application Priority Data

Nov. 7, 2019    (KR) .................. 10-2019-0141771
Feb. 28, 2020   (KR) .................. 10-2020-0025247

(51) Int. Cl.
*B60K 1/02*    (2006.01)
*F16H 37/04*   (2006.01)
(Continued)

(52) U.S. Cl.
CPC ............. *F16H 37/046* (2013.01); *B60K 1/02* (2013.01); *F16H 37/06* (2013.01);
(Continued)

(58) Field of Classification Search
CPC .......... F16H 37/046; F16H 2200/2005; F16H 2200/2094; F16H 2200/0021; F16H 2037/047; F16H 2037/048; B60K 1/02
(Continued)

(56) References Cited

U.S. PATENT DOCUMENTS 5,775,449 A    7/1998   Moroto et al.
6,958,028 B2  10/2005   Janson et al.
(Continued)

FOREIGN PATENT DOCUMENTS

CN    104948716 A        9/2015
DE    102008002380 A1 * 12/2009    ............... B60K 6/48
(Continued)

OTHER PUBLICATIONS

Notice of Allowance dated Feb. 18, 2021 for the corresponding U.S. Appl. No. 16/884,306, 19 pages.
(Continued)

*Primary Examiner* — Roger L Pang
(74) *Attorney, Agent, or Firm* — LEMPIA SUMMERFIELD KATZ LLC

(57) ABSTRACT

A powertrain for an electric vehicle includes: a planetary gear including a first rotating element, a second rotating element, and a third rotating element, where the first rotating element is connected to a first shaft, the second rotating element is connected to a second shaft, and the third rotating element is selectively connected to a transmission housing; a first motor supplying power to the first shaft at all times; and a second motor selectively supplying power to the first shaft and the second shaft. Two rotating elements among the first, second, third rotating elements of the planetary gear are selectively connected to integrally rotate the entire planetary gear.

5 Claims, 9 Drawing Sheets

(51) Int. Cl.
*F16H 37/06* (2006.01)
*F16H 3/44* (2006.01)

(52) U.S. Cl.
CPC .. *F16H 2003/445* (2013.01); *F16H 2037/047* (2013.01); *F16H 2200/0021* (2013.01); *F16H 2200/0043* (2013.01); *F16H 2200/0052* (2013.01); *F16H 2200/2005* (2013.01); *F16H 2200/2094* (2013.01)

(58) Field of Classification Search
USPC .............................. 475/302, 303, 317, 320
See application file for complete search history.

(56) References Cited

U.S. PATENT DOCUMENTS

| | | | |
|---|---|---|---|
| 7,261,670 B2 | 8/2007 | Endo et al. | |
| 7,469,609 B2 | 12/2008 | Baldwin | |
| 8,051,732 B2 | 11/2011 | Gitt | |
| 9,260,109 B2 | 2/2016 | Tanaka | |
| 9,346,462 B2 | 5/2016 | Park | |
| 9,528,583 B2 | 12/2016 | Lübke et al. | |
| 10,081,240 B2 | 9/2018 | Lee et al. | |
| 11,181,174 B2 | 11/2021 | Kim et al. | |
| 2002/0088291 A1 | 7/2002 | Bowen | |
| 2002/0189397 A1 | 12/2002 | Sakamoto et al. | |
| 2003/0100395 A1 | 5/2003 | Hiraiwa | |
| 2005/0164827 A1 | 7/2005 | Beaty et al. | |
| 2005/0204837 A1 | 9/2005 | Janson et al. | |
| 2006/0025272 A1 | 2/2006 | Pelouch | |
| 2007/0149334 A1 | 6/2007 | Holmes et al. | |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0151491 A1 | 6/2009 | Tabata et al. | |
| 2009/0166107 A1 | 7/2009 | Robart et al. | |
| 2010/0051360 A1 | 3/2010 | Oba et al. | |
| 2010/0160103 A1 | 6/2010 | Holmes | |
| 2011/0184612 A1 | 7/2011 | Fujii et al. | |
| 2012/0316738 A1 | 12/2012 | Teslak et al. | |
| 2014/0349799 A1* | 11/2014 | Kaltenbach ............ B60K 6/365 475/5 |
| 2015/0068336 A1 | 3/2015 | Peterson et al. | |
| 2016/0167639 A1 | 6/2016 | Hori et al. | |
| 2016/0312857 A1 | 10/2016 | Wechs | |
| 2017/0009862 A1 | 1/2017 | Gumpoldsberger et al. | |
| 2017/0159779 A1 | 6/2017 | Hwang et al. | |
| 2017/0282700 A1 | 10/2017 | Bergquist et al. | |
| 2018/0099561 A1 | 4/2018 | Xu et al. | |
| 2019/0118635 A1 | 4/2019 | Hwang et al. | |
| 2020/0047602 A1 | 2/2020 | Chae et al. | |

FOREIGN PATENT DOCUMENTS

| | | |
|---|---|---|
| DE | 102008002380 A1 | 12/2009 |
| DE | 102018222258 A1 * | 6/2020 |
| DE | 102018222258 A1 | 6/2020 |
| DE | 102019209985 A1 | 1/2021 |
| KR | 20080087907 A | 10/2008 |
| KR | 20130117184 A | 10/2013 |
| KR | 20140118028 A | 10/2014 |
| KR | 20160051051 A | 5/2016 |
| KR | 20190066675 A | 6/2019 |
| KR | 20190134147 A | 12/2019 |
| WO | 2021073748 A1 | 4/2021 |

OTHER PUBLICATIONS

Office Action dated Apr. 13, 2021 from corresponding U.S. Appl. No. 16/993,436, 31 pp.
Office Action dated Feb. 18, 2021 for the corresponding U.S. Appl. No. 16/882,299, 26 pages.
Office Action issued in related U.S. Appl. No. 17/243,995, dated Jun. 14, 2022 (8 pages).
Office Action issued in related U.S. Appl. No. 17/339,266, dated May 5, 2022 (11 pages).
Office Action issued in related U.S. Appl. No. 17/531,454, dated Oct. 25, 2022, 12pp.
Notice of Allowance dated Apr. 19, 2022 in corresponding Korean patent No. 10-2020-0145399.
Notice of Allowance dated Dec. 9, 2022 for the corresponding U.S. Appl. No. 17/339,266.
Office Action dated Dec. 28, 2022 from corresponding U.S. Appl. No. 17/531,475.

* cited by examiner

FIG. 3

| GEAR STAGE | S1 | | S2 | | S3 | |
|---|---|---|---|---|---|---|
| | a | b | c | d | e | f |
| 1 | ● | | ● | | ● | |
| 2 | | ● | ● | | ● | |
| 3 | | ● | | ● | ● | |
| 4 | ● | | | ● | | ● |
| 5 | ● | | ● | | | ● |
| 6 | | ● | ● | | | ● |

FIG. 7

| GEAR STAGE | S2 | | S3 | |
|---|---|---|---|---|
| | c | d | e | f |
| 1 | ● | | ● | |
| 2 | | ● | ● | |
| 3 | | ● | | ● |
| 4 | ● | | | ● |

POWERTRAIN FOR ELECTRIC VEHICLE

CROSS-REFERENCE TO RELATED APPLICATION

This application is a divisional application of non-provisional U.S. patent application Ser. No. 16/887,267, filed on May 29, 2020, which claims priority to and the benefit of Korean Patent Application Nos. 10-2019-0141771, filed on Nov. 7, 2019 and 10-2020-0025247, filed on Feb. 28, 2020, the entire contents of each of which are incorporated herein by reference.

FIELD

The present disclosure relates to technology of powertrains provided in electric vehicles.

BACKGROUND

The statements in this section merely provide background information related to the present disclosure and may not constitute prior art.

Electric vehicles (EVs) are vehicles using power provided by electric motors for propulsion. Such electric vehicles can significantly contribute to the reduction of environmental pollution in metropolitan areas in that there are no emissions.

For the popularization of such electric vehicles, the improvement of various technologies is desired. In particular, a technology for significantly increasing a drivable range after charged once is desired.

To increase the drivable range, vehicles should be able to satisfy maximum gradeability and maximum speed desired for a vehicle while improving fuel efficiency (i.e., a driving range per unit of electrical energy (km/kWh)) by reducing the size and capacity of a motor disposed in an electric vehicle. In this regard, a transmission is disposed in an electric vehicle.

For the above-described reasons, the transmission disposed in the electric vehicle has high power transfer efficiency due to a relatively simple configuration while avoiding either torque interruption in which torque transferred to driving wheels is interrupted or a gear shifting shock during gear shifting.

The information disclosed in the Background of the Disclosure section is only for the enhancement of understanding of the background of the disclosure, and should not be taken as an acknowledgment or as any form of suggestion that this information forms a prior art that would already be known to a person skilled in the art.

SUMMARY

The present disclosure provides a powertrain for an electric vehicle, and the powertrain is able to satisfy maximum gradeability and maximum speed desired for a vehicle while reducing the capacity of a motor by providing a plurality of shift ratios, to improve electrical efficiency of the vehicle by realizing high power transfer efficiency using a relatively simple configuration and a relatively small weight, and to prevent torque interruption and shift shock.

In accordance with an aspect of the present disclosure, a powertrain for an electric vehicle may include: a planetary gear having three rotating elements (i.e., first, second and third rotating elements), where the first rotating element is connected to a first shaft and the second rotating element is connected to a second shaft; a first motor installed to selectively supply power to the first shaft at two or more gear ratios; and a second motor installed to selectively supply power to the first shaft and the second shaft.

The third rotating element of the planetary gear may be selectively connected to a transmission housing, and two rotating elements among the three rotating elements of the planetary gear may be selected to be connected to each other, such that the entire planetary gear is rotated integrally.

A first shift assembly may be provided between the first motor and the first shaft to switch between a state in which power provided by the first motor is transmitted directly to the first shaft and a state in which power provided by the first motor is shifted by a gear train before being transmitted to the first shaft.

In one form, a rotating shaft of the first motor is coaxial with the first shaft. The first shift assembly may include a gear engagement unit, a hub and a sleeve, which are provided on a rotating shaft of the first motor. A first gear including a clutch gear configured to engage with the sleeve of the gear engagement unit may be rotatably disposed on the rotating shaft of the first motor. A second gear including a clutch gear configured to engage with the sleeve of the gear engagement unit may be disposed on the first shaft such that rotation of the second gear is restrained.

A third gear in external engagement with the first gear and a fourth gear in external engagement with the second gear may be coaxially connected to each other.

A first shift assembly may be provided between the first motor and the first shaft such that the power provided by the first motor is transmitted to the first shaft through one gear train of two external engagement gear trains having different gear ratios.

In some forms of the present disclosure, the first shift assembly may include a gear engagement unit, a hub and a sleeve of which are provided on a rotating shaft of the first motor. A first gear and a second gear may be rotatably provided on both sides of the hub. A third gear in external engagement with the first gear and a fourth gear in external engagement with the second gear may be coaxially connected to each other. A fifth gear may be disposed on the shaft of the third gear and the fourth gear such that rotation of the fifth gear is restrained. A sixth gear in external engagement with the fifth gear may be disposed on the first shaft such that rotation of the sixth gear is restrained.

In some forms of the present disclosure, a seventh gear may be connected to the first shaft such that rotation of the seventh gear is restrained. An eighth gear may be connected to the second shaft such that such that rotation of the eighth gear is restrained. A ninth gear in external engagement with the seventh gear and a tenth gear in external engagement with the eighth gear may be disposed coaxially with each other. The second motor may be disposed to be connectable to the first shaft and the second shaft via a second shift assembly disposed between the ninth gear and the tenth gear.

In some forms of the present disclosure, the second shift assembly may include a gear engagement unit, a hub and a sleeve of which are provided on a rotating shaft of the ninth gear and the tenth gear.

In another form, the second motor may be coaxially disposed on the first shaft. The second motor may be configured such that the power provided by the second motor is transmitted to the first shaft or the second shaft through an eleventh gear disposed concentrically on the first shaft and a twelfth gear in external engagement with the eleventh gear to be coaxial with the ninth gear and the tenth gear.

The powertrain may further include a third shift assembly fixing the third rotating element of the planetary gear to the transmission housing or connecting the third rotating element of the planetary gear to the second shaft by linear displacement following an axial direction of the first shaft.

In accordance with another aspect of the present disclosure, a powertrain for an electric vehicle. The powertrain may include: a planetary gear having a first rotating element, a second rotating element and a third rotating element, where the first rotating element is connected to a first shaft, the second rotating element is connected to a second shaft, and the third rotating element is connected to a third shaft; a first motor configured to selectively supply power to the first shaft at two or more gear ratios; and a second motor configured to selectively supply power to the first shaft and the second shaft. The third shaft may be fixedly disposed on a transmission housing, and any two shafts among the first, second, and third shafts may restrain each other.

Further, in accordance with yet another aspect of the present disclosure, there is provided a powertrain for an electric vehicle. The powertrain may include: a planetary gear including three rotating elements (i.e., a first rotating element, a second rotating element and a third rotating element), among which the first rotating element is connected to a first shaft, the second rotating element is connected to a second shaft, and the third rotating element is selectively connected to a transmission housing; a first motor configured to supply power to the first shaft at all times; and a second motor configured to selectively supply power to the first shaft and the second shaft. Any two rotating elements among the three rotating elements of the planetary gear are selectively connected to integrally rotate the entire planetary gear.

The first rotating element of the planetary gear may be a sun gear; the second rotating element of the planetary gear may be a carrier; and the third rotating element of the planetary gear may be a ring gear.

In some forms of the present disclosure, a seventh gear may be connected to the first shaft in a restrained state, an eighth gear may be connected to the second shaft in a restrained state, a ninth gear in external engagement with the seventh gear and a tenth gear in external engagement with the eighth gear may be installed coaxially with each other, and the second motor may be installed to be connectable to the first shaft and the second shaft via a second shift assembly installed between the ninth gear and the tenth gear.

In some forms of the present disclosure, the second shift assembly may include a gear engagement unit, a hub and a sleeve of which are provided on a rotating shaft of the ninth gear and the tenth gear.

In some forms of the present disclosure, the second motor may be coaxially installed on the first shaft; and power of the second motor may be transmitted to the first shaft or the second shaft by an eleventh gear installed coaxially on the first shaft and a twelfth gear in external engagement with the eleventh gear to be coaxial with the ninth gear and the tenth gear.

In some forms of the present disclosure, the powertrain may further include a third shift assembly configured to fix the third rotating element of the planetary gear to the transmission housing or connect the third rotating element of the planetary gear to the second shaft by linear displacement following an axial direction of the first shaft.

Further, in accordance with yet another aspect of the present disclosure, there is provided a powertrain for an electric vehicle. The powertrain may include: a planetary gear including three rotating elements, among which a first rotating element is connected to a first shaft, a second rotating element is connected to a second shaft, and a third rotating element is connected to a third shaft; a first motor configured to supply power to the first shaft at all times; and a second motor configured to selectively supply power to the first shaft and the second shaft. The third shaft is fixedly connected to a transmission housing, and any two shafts among the first, second, and third shafts are configured to restrain each other.

Further, in accordance with yet another aspect of the present disclosure, there is provided a powertrain for an electric vehicle. The powertrain may include: a planetary gear including three rotating elements, among which a first rotating element is connected to a first shaft, a second rotating element is connected to a second shaft, and a third rotating element is selectively connected to a transmission housing; a second motor configured to supply power to the second shaft at all times; and a first motor configured to selectively supply power to the first shaft and the second shaft. Any two rotating elements among the three rotating elements of the planetary gear are selectively connected to integrally rotate the entire planetary gear.

In some forms of the present disclosure, the first rotating element of the planetary gear may be a sun gear; the second rotating element of the planetary gear may be a carrier; and the third rotating element of the planetary gear may be a ring gear.

In some forms of the present disclosure, a first shift assembly may be provided between the second motor and the second shaft and configured to switch between a state in which power of the second motor is directly transmitted to the second shaft and a state in which the power of the second motor is transmitted to the first shaft by shifting of a gear train.

In some forms of the present disclosure, a rotating shaft of the second motor is coaxial with the second shaft; the first shift assembly may include a gear engagement unit, a hub and a sleeve of which are provided on the rotating shaft of the second motor; a first gear including a clutch gear engageable with the sleeve of the gear engagement unit may be rotatably installed on the rotating shaft of the second motor; the clutch gear configured to engage with the sleeve of the gear engagement unit may be installed on the second shaft in a state in which rotation of the clutch gear is strained; and a second gear may be installed on the first shaft and configured to receive the power of the second motor in a state in which rotation of the second gear is restrained.

In some forms of the present disclosure, a third gear in external engagement with the first gear and a fourth gear in external engagement with the second gear may be coaxially connected to each other.

In some forms of the present disclosure, the powertrain may further include a third shift assembly configured to fix the third rotating element of the planetary gear to the transmission housing or connect the third rotating element of the planetary gear to the second shaft by linear displacement following an axial direction of the first shaft.

In some forms of the present disclosure, a first shift assembly may be provided between the second motor and the first shaft to switch between a state in which power of the second motor is directly transmitted to the first shaft and a state in which the power of the second motor is transmitted to the second shaft by shifting of a gear train.

In some forms of the present disclosure, the second motor may be disposed such that a rotating shaft thereof is coaxial with the first shaft; the first shift assembly may include a gear engagement unit, a hub and a sleeve of which are provided on the rotating shaft of the second motor; a first gear including a clutch gear configured to engage with the sleeve of the gear engagement unit may be rotatably installed on the rotating shaft of the second motor; the clutch gear configured to engage with the sleeve of the gear engagement unit may be installed on the first shaft in a state in which rotation of the clutch gear is strained; and a second gear may be installed on the second shaft and configured to receive the power of the second motor in a state in which rotation of the second gear is restrained.

In some forms of the present disclosure, a third gear in external engagement with the first gear and a fourth gear in external engagement with the second gear may be coaxially connected to each other.

In some forms of the present disclosure, the powertrain may further include a third shift assembly configured to fix the third rotating element of the planetary gear to the transmission housing or connect the third rotating element of the planetary gear to the second shaft by linear displacement following an axial direction of the first shaft.

The present disclosure can satisfy maximum gradeability and maximum speed required for a vehicle while reducing the capacity of a motor by providing a plurality of shift ratios, improve electrical efficiency of the vehicle by realizing high power transfer efficiency using a relatively simple configuration and a relatively small weight, and prevent torque interruption and shift shock.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a table illustrating operating modes of first to third forms of the powertrain for the electric vehicle according to one form of the present disclosure;

FIG. 7 is a table illustrating operating modes of the fourth and fifth forms of the powertrain for the electric vehicle according to one form of the present disclosure;

Figure 1:
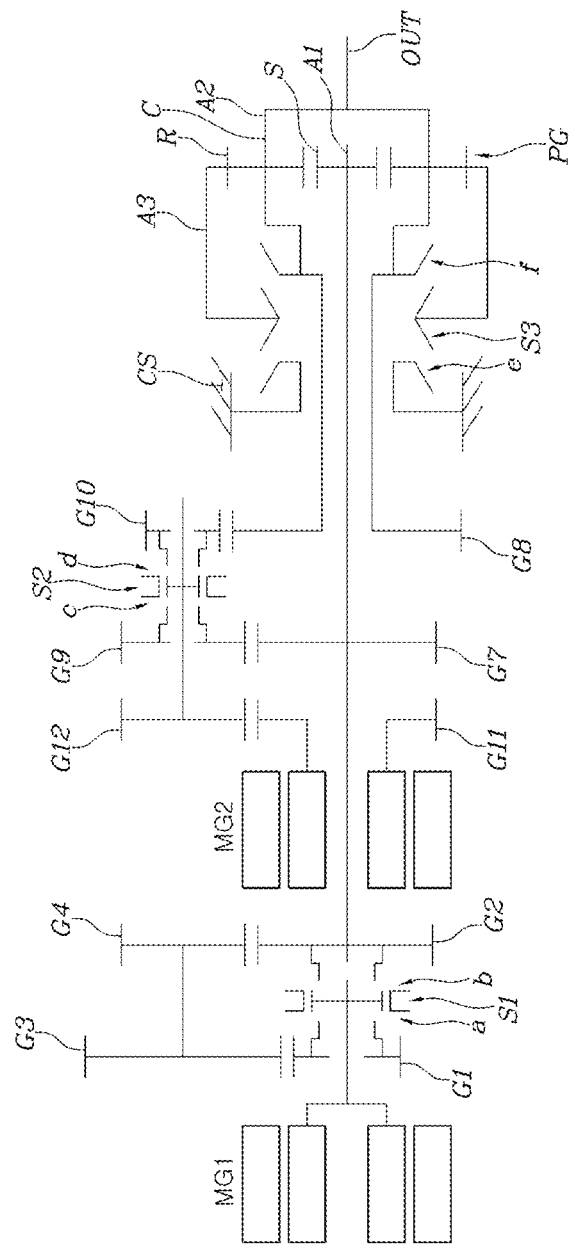
FIG. 1 is a diagram illustrating a first form of a powertrain for an electric vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
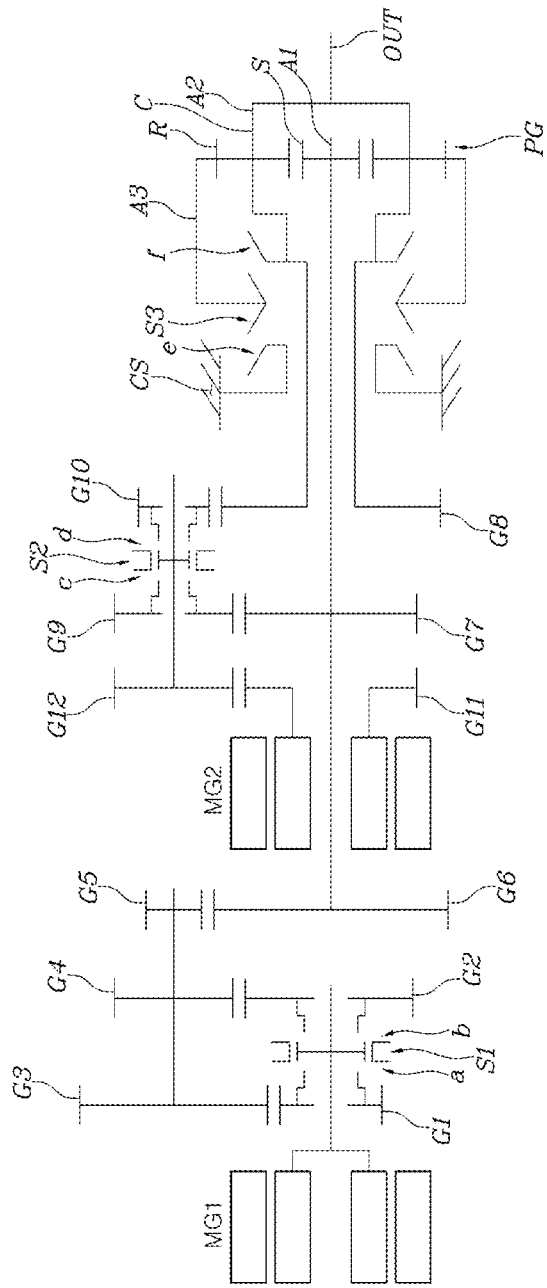
FIG. 2 is a diagram illustrating a second form of the powertrain for the electric vehicle according to the present disclosure.

Referring to FIGS. 1 and 2, first to third forms of a powertrain for an electric vehicle according to one form of the present disclosure commonly include: a planetary gear PG having three rotating elements (i.e., first, second and third rotating elements), where the first rotating element is connected to a first shaft A1 and the second rotating element is connected to a second shaft A2; a first motor MG1 installed to selectively supply power to the first shaft A1 at two or more gear ratios; and a second motor MG2 installed to selectively supply power to the first shaft A1 and the second shaft A2.

The third rotating element of the planetary gear PG may be connected to a third shaft A3, and may be selectively connected to a transmission housing CS.

In addition, two rotating elements randomly selected from among the three rotating elements of the planetary gear PG may be connected to each other, such that the entire planetary gear PG can be rotated integrally.

Here, when the first shaft A1 is regarded as an input shaft to which power may be transmitted from the first motor MG1 and the second motor MG2 and the second shaft A2 is regarded as an output shaft to which power may be transmitted from the second motor MG2 and from which shifted power may be output, the present disclosure may considered to be configured such that power that the first motor MG1 provides to the input shaft in an adjusted manner and power that the second motor MG2 provides to the input shaft or the output shaft may be readjusted using the planetary gear PG before being output to the output shaft.

For reference, all of the first shaft A1, the second shaft A2, and the third shaft A3 are concentrically disposed as rotating shafts of the rotating elements of the planetary gear PG. The first rotating element of the planetary gear PG may be referred to as being a sun gear S, the second rotating element of the planetary gear PG may be referred to as being a carrier C, and the third rotating element of the planetary gear PG may be referred to as being a ring gear R.

For reference, the second shaft A2 in the drawings is expressed as OUT, and is shown to function as an output shaft to which power is output.

Forms of the present disclosure commonly include a third shift assembly S3 fixing the third rotating element of the planetary gear PG to the transmission housing CS or connecting the third rotating element of the planetary gear PG to the second shaft A2 by a linear displacement along the axial direction of the first shaft A1.

The third rotating element of the planetary gear PG is connected to the second rotating element via the second shaft A2, such that all of the rotating elements of the planetary gear PG may rotate integrally.

All of the rotating elements of the planetary gear PG may be configured to rotate integrally when the third shaft A3 is connected to the second shaft A2 as described above and when the third shaft A3 is connected to the first shaft A1 or the first shaft A1 and the second shaft A2 are connected.

The third shift assembly S3 may include, for example, a friction clutch able to produce a linear displacement by sliding linearly along the axial direction while the rotation thereof is restrained by the third shaft A3, so as to switch between a state in which the third rotating element of the planetary gear PG connected to the third shaft A3 is connected to the transmission housing CS and a state in which the third rotating element is connected to the second shaft A2.

In the first form illustrated in FIG. 1, a first shift assembly S1 is provided between the first motor MG1 and the first shaft A1 to switch between a state in which power provided by the first motor MG1 is transmitted directly to the first shaft A1 and a state in which power provided by the first motor MG1 is shifted by a gear train before being transmitted to the first shaft A1.

Specifically, the first motor MG1 is disposed such that the rotating shaft thereof is coaxial with the first shaft A1, the first shift assembly S1 includes a gear engagement unit, a hub and a sleeve of which are disposed on the rotating shaft of the first motor MG1, a first gear G1 including a clutch gear engageable with the sleeve of the gear engagement unit is rotatably disposed on the rotating shaft of the first motor MG1, and a second gear G2 including a clutch gear engageable with the sleeve of the gear engagement unit is disposed on the first shaft A1 such that the rotation of the second gear G2 is restrained.

Accordingly, the first shift assembly S1 includes the gear engagement unit substantially provided on the rotating shaft of the first motor MG1, the clutch gear of the first gear G1, the clutch gear of the second gear G2, and the like.

In addition, a third gear G3 in external engagement with the first gear G1 and a fourth gear G4 in external engagement with the second gear G2 are coaxially connected to each other.

Accordingly, when the sleeve of the first shift assembly S1 is engaged with the clutch gear of the first gear G1, power provided by the first motor MG1 is transmitted to the first shaft A1 sequentially through the first gear G1, the third gear G3, the fourth gear G4, and the second gear G2. When the sleeve of the first shift assembly S1 is engaged with the clutch gear of the second gear G2, power provided by the first motor MG1 is transmitted directly to the first shaft A1. As a result, the power provided by the first motor MG1 can be transmitted to the first shaft A1 at different shift ratios.

In addition, the second form illustrated in FIG. 2 differs from the first form, in that the first shift assembly S1 is disposed between the first motor MG1 and the first shaft A1 such that power provided by the first motor MG1 can be transmitted to the first shaft A1 through one gear of two external engagement gears having different gear ratios.

Here, the first shift assembly S1 includes the gear engagement unit, the hub and the sleeve of which are disposed on the rotating shaft of the first motor MG1. The first gear G1 and the second gear G2 are rotatably provided on both sides of the hub. The third gear G3 in external engagement with the first gear G1 and the fourth gear G4 in external engagement with the second gear G2 are coaxially connected to each other. A fifth gear G5 is disposed on the shaft of the third gear G3 and the fourth gear G4 such that the rotation of the fifth gear G5 is restrained. A sixth gear G6 in external engagement with the fifth gear G5 is disposed on the first shaft A1 such that the rotation of the sixth gear G6 is restrained.

Accordingly, when the sleeve of the first shift assembly S1 is engaged with the clutch gear of the first gear G1, power provided by the first motor MG1 is transmitted to the first shaft A1 through the first gear G1, the third gear G3, the fifth gear G5, and the sixth gear G6. When the sleeve of the first shift assembly S1 is engaged with the clutch gear of the second gear G2, power provided by the first motor MG1 is transmitted to the first shaft A1 via the second gear G2, the fourth gear G4, the fifth gear G5, and the sixth gear G6. As a result, the power provided by the first motor MG1 can be transmitted to the first shaft A1 at different shift ratios.

For reference, an additional pair of external engagement gears configured in the same manner as a pair of external engagement gears including the first gear G1 and the third gear G3 or a pair of external engagement gears including the second gear G2 and the fourth gear G4, as well as, an additional transmission connecting the further pair of external engagement gears to the first motor MG1, may be provided. Power provided by the first motor MG1 may be transmitted at another shift ratio before being input to the first shaft A1 through the fifth gear G5 and the sixth gear G6.

In addition, a seventh gear G7 is connected to the first shaft A1 such that the rotation of the seventh gear G7 is restrained. An eighth gear G8 is connected to the second shaft A2 such that the rotation of the eighth gear G8 is restrained. A ninth gear G9 in external engagement with the seventh gear G7 and a tenth gear G10 in external engagement with the eighth gear G8 are disposed coaxially with each other. The second motor MG2 is disposed to be connectable to the first shaft A1 and the second shaft A2 via the second shift assembly S2 disposed between the ninth gear G9 and the tenth gear G10.

For reference, the seventh gear G7 to the tenth gear G10 and the second shift assembly S2 are common components of both the first form and the second form. The second shift assembly S2 includes the gear engagement unit, the hub and the sleeve of which are disposed on the rotating shaft of the ninth gear G9 and the tenth gear G10.

Since the ninth gear G9 and the tenth gear G10 are respectively provided with a clutch gear in engagement with the sleeve of the gear engagement unit, the second shift assembly S2 substantially includes the gear engagement unit provided on the rotating shaft of the ninth gear G9 and the tenth gear G10, the clutch gear of the ninth gear G9, and the clutch gear of the tenth gear G10.

In addition, the second motor MG2 is coaxially disposed on the first shaft A1. The second motor MG2 is configured such that power provided by the second motor MG2 is transmitted to the first shaft A1 or the second shaft A2 through an eleventh gear G11 disposed concentrically on the first shaft A1 and a twelfth gear G12 in external engagement with the eleventh gear G11 to be coaxial with the ninth gear G9 and the tenth gear G10.

Accordingly, when the sleeve of the second shift assembly S2 is engaged with the clutch gear of the ninth gear G9, power provided by the second motor MG2 is transmitted to the first shaft A1 through the eleventh gear G11, the twelfth gear G12, the ninth gear G9, and the seventh gear G7. When the sleeve of the second shift assembly S2 is engaged with the clutch gear of the tenth gear G10, power provided by the second motor MG2 is transmitted to the second shaft A2 through the eleventh gear G11, the twelfth gear G12, the tenth gear G10, and the eighth gear G8.

Figure 3:
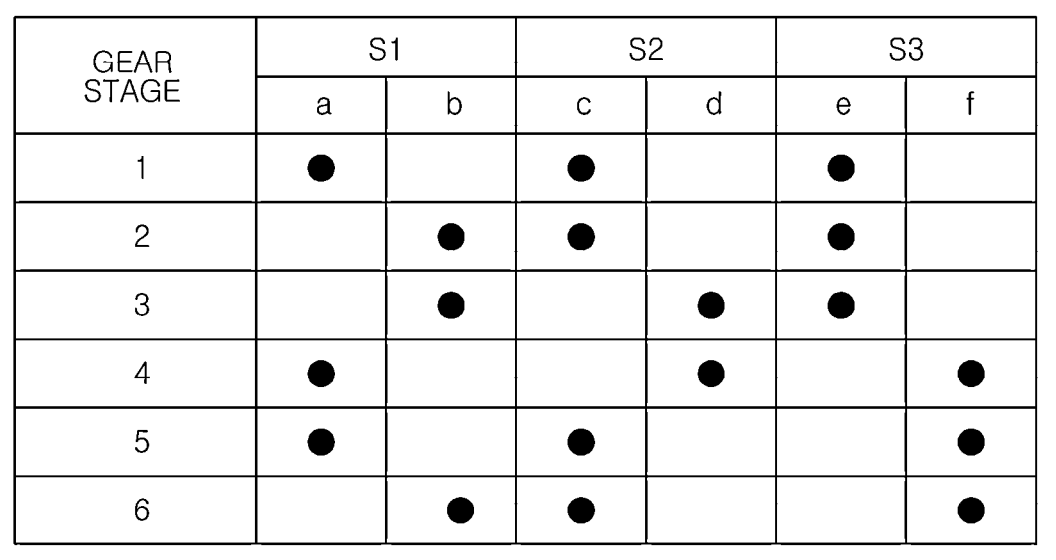

FIG. 3 is a table illustrating operating modes of first to third forms of the powertrain for an electric vehicle according to the present disclosure, in which a total of six gear stages are provided.

For reference, in the shift assemblies, "a" indicates a configuration in which the sleeve of the first shift assembly S1 connects or disconnects the clutch gear of the first gear G1 to and from power, "b" indicates a configuration in which the sleeve of the first shift assembly S1 connects or disconnects the clutch gear of the second gear G2 to and from power, "c" indicates a configuration in which the sleeve of the second shift assembly S2 connects or disconnects the clutch gear of the ninth gear G9 to and from power, "d" indicates a configuration in which the sleeve of the second shift assembly S2 connects or disconnects the clutch gear of the tenth gear G10 to and from power, "e" indicates the third shift assembly S3 being configured to connect or disconnect the third rotating element of the planetary gear PG to or from the transmission housing CS, and "f" indicates the third shift assembly S3 being configured to connect or disconnect the third rotating element of the planetary gear PG to or from the second shaft A2.

With reference to the form illustrated in FIG. 1, gear stages and gear shifting of the powertrain for an electric vehicle according to the present disclosure will be described. In the form illustrated in FIG. 2, gear shifting is performed substantially in the same manner.

The first gear stage is realized by fixing the third rotating element of the planetary gear PG to the transmission housing CS, engaging the sleeve of the first shift assembly S1 with the clutch gear of the first gear G1, and engaging the sleeve of the second shift assembly S2 with the clutch gear of the ninth gear G9.

Here, power provided by the first motor MG1 is transmitted to the first shaft A1 through the first gear G1, the third gear G3, the fourth gear G4, and the second gear G2. Power provided by the second motor MG2 is transmitted to the first shaft A1 through the eleventh gear G11, the twelfth gear G12, the ninth gear G9, and the seventh gear G7.

Accordingly, both the power provided by the first motor MG1 and the power provided by the second motor MG2 may be transmitted to the first shaft A1. Driving in the first gear may be realized using one motor of the two motors, depending on the driving condition of the vehicle.

Power transmitted to the first shaft A1 as described above is input from the first shaft A1 to the sun gear S, i.e. the first rotating element, and is reduced by the carrier C, i.e. the second rotating element, before being output to the second shaft A2, since a ring gear R, i.e. the third rotating element of the planetary gear PG, is fixed to the transmission housing CS by the third shift assembly S3.

The second shaft A2 is connected to one or more driving wheels via a separate differential device or the like, such that the vehicle can be propelled by power transferred as above.

Gear shifting from the first gear stage to the second gear stage is performed by disengaging the sleeve of the first shift assembly S1 from the clutch gear of the first gear G1 and engaging the sleeve of the first shift assembly S1 with the clutch gear of the second gear G2.

In this case, in a state in which the torque of the first motor MG1 is reduced while the second motor MG2 is allowed to continuously supply power, the sleeve of the first shift assembly S1 is disengaged to be in the neutral position and then is engaged with the clutch gear of the second gear G2, so that the gear shifting can be performed smoothly without torque interruption or shift shock.

That is, even in a state in which the sleeve of the first shift assembly S1 is disengaged to be in the neutral position, the power provided by the second motor MG2 is continuously supplied to the first shaft A1, so that torque can be continuously transmitted to one or more driving wheels to prevent torque interruption. During the disengagement and engagement of the sleeve of the first shift assembly S1, the torque of the first motor MG1 can be reduced or completely canceled. Consequently, the sleeve of the first shift assembly S1 can be smoothly and softly disengaged and engaged, so that excellent shifting feel can be obtained.

In the second gear stage realized as above, the power provided by the first motor MG1 is transmitted to the first shaft A1 directly through the sleeve of the first shift assembly S1 and the second gear G2 and reduced by the planetary gear PG before being output to the second shaft A2.

Gear shifting from the second gear stage to the third gear stage is performed by disengaging the sleeve of the second shift assembly S2 from the clutch gear of the ninth gear G9 and engaging the sleeve of the second shift assembly S2 with clutch gear of the tenth gear G10.

Likewise, in a state in which the torque of the second motor MG2 is reduced or released while the first motor MG1 is allowed to continuously supply power to the first shaft A1, the sleeve of the second shift assembly S2 is disengaged from the clutch gear of the ninth gear G9 to be in the neutral position and then is engaged with the clutch gear of the tenth gear G10, so that the gear shifting can be performed smoothly without torque interruption or shift shock.

Consequently, the sleeve of the second shift assembly S2 is smoothly converted from a state in which the sleeve is engaged with the clutch gear of the ninth gear G9 to a state in which the sleeve is engaged with the clutch gear of the tenth gear G10 while the power provided by the first motor MG1 is being continuously supplied to the driving wheels, so that the gear shifting to the third gear stage is completed.

In the third gear stage, power provided by the first motor MG1 is input to the sun gear S of the planetary gear PG through the first shaft A1, and power provided by the second motor MG2 is input to the carrier C of the planetary gear PG through the second shaft A2.

Referring to FIG. 3, the fourth to sixth gear stages are realized in a state in which the third shift assembly S3 has connected the third rotating element of the planetary gear PG to the second shaft A2. That is, in the first to third gear stages, the third shift assembly S3 fixes the ring gear R, i.e. the third rotating element of the planetary gear PG, to the transmission housing CS, such that the power input to the first rotating element of the planetary gear PG is reduced before being output to the carrier C, i.e. the second rotating element, and the second shaft A2. In the fourth to sixth gear stages, the third shift assembly S3 connects the third rotating element of the planetary gear PG to the second rotating element via the second shaft A2, such that the power input to the planetary gear PG is output without reduction or increase in speed.

For gear shifting from the third gear stage to the fourth gear stage, canceling the torque of the first motor MG1 and controlling the first shift assembly S1 to be in the neutral position are performed from a state in which the third shift assembly S3 has fixed the third rotating element of the planetary gear PG to the transmission housing CS in the third gear stage, the third rotating element of the planetary gear PG is connected to the second shaft A2 via the third shift assembly S3, and then the first shift assembly S1 is controlled to be engaged with the clutch gear of the first gear G1 from the neutral position. In this manner, power provided by the first motor MG1 is transmitted to the driving wheels, thereby completing the gear shifting. During the gear shifting, the power provided by the second motor MG2 is continuously provided to the driving wheels through the second shaft A2, thereby preventing torque interruption.

Afterwards, gear shifting from the fourth gear stage to the fifth gear stage is performed. In a state in which the first motor MG1 is continuously transmitting power to the driving wheels, the torque of the second motor MG2 is reduced, and the sleeve of the second shift assembly S2 is disengaged from the clutch gear of the tenth gear G10 and then is engaged with the clutch gear of the ninth gear G9. In addition, gear shifting from the fifth gear stage to the sixth gear stage is performed. In a state in which the second motor MG2 is continuously supplying power to the driving wheels, the sleeve of the first shift assembly S1 is disengaged from the clutch gear of the first gear G1 and then is engaged with the clutch gear of the second gear G2.

As described above, also in the gear shifting from the fourth gear stage to the fifth gear stage and the gear shifting from the fifth gear stage to the sixth gear stage, shifting can be performed in a state in which one more of the first motor MG1 and the second motor MG2 can continuously transmit power to the driving wheels, thereby preventing torque interruption and obtaining smooth shifting feel.

In addition, since the powertrain for an electric vehicle according to the present disclosure is basically configured to transmit power provided by the motor to the driving wheels using a related-art automated manual transmission (AMT), superior power transfer efficiency is obtained. In particular, in the sixth gear stage, i.e. the highest gear stage, power provided by the first motor MG1 is transmitted directly to the first shaft A1, and all of the rotating elements of the planetary gear PG are restrained by each other, such that the first shaft A1 rotates integrally with the second shaft A2. As a result, the powertrain according to the present disclosure can output the power provided by the first motor MG1 without gear shifting, thereby achieving significantly high power transfer efficiency and increasing or maximizing fuel efficiency of an electric vehicle.

Figure 4:
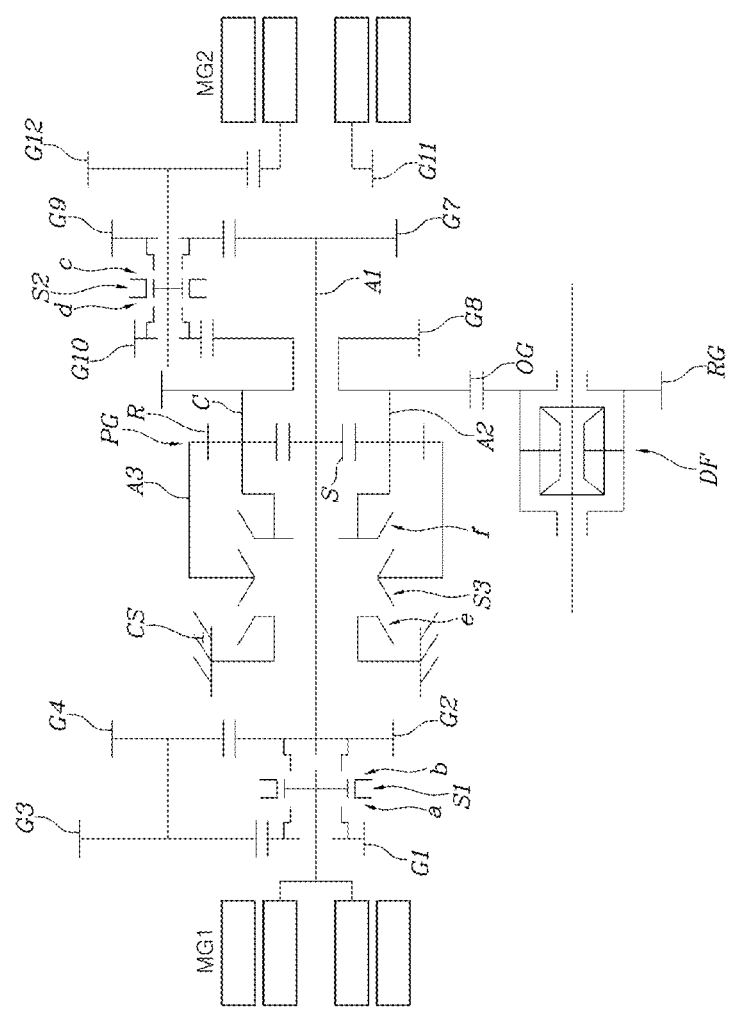
FIG. 4 is a diagram illustrating a third form of the powertrain for the electric vehicle according to one form of the present disclosure.

For reference, FIG. 4 is a modified form of the first form illustrated in FIG. 1. In the form illustrated in FIG. 4, the second motor MG2 and gears connected to the second motor MG2 are moved to the right of the planetary gear PG.

In addition, an output gear OG is provided on the carrier C of the planetary gear PG, and a ring gear RG of a differential DF is engaged directly with the output gear OG.

Figure 5:
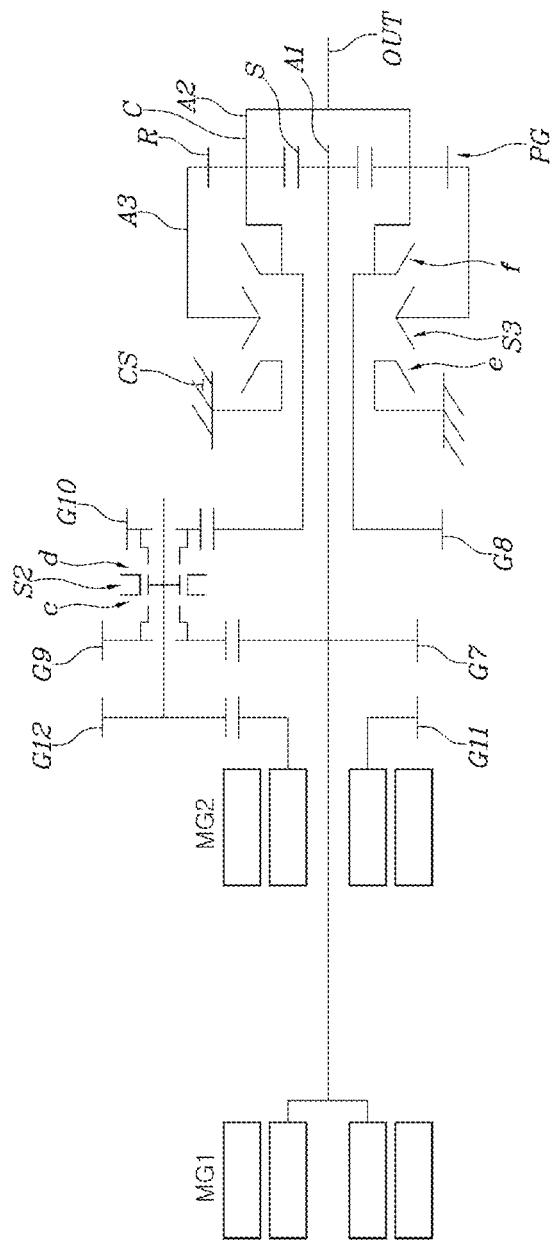
FIG. 5 is a diagram illustrating a fourth form of the powertrain for the electric vehicle according to one form of the present disclosure.
Figure 6:
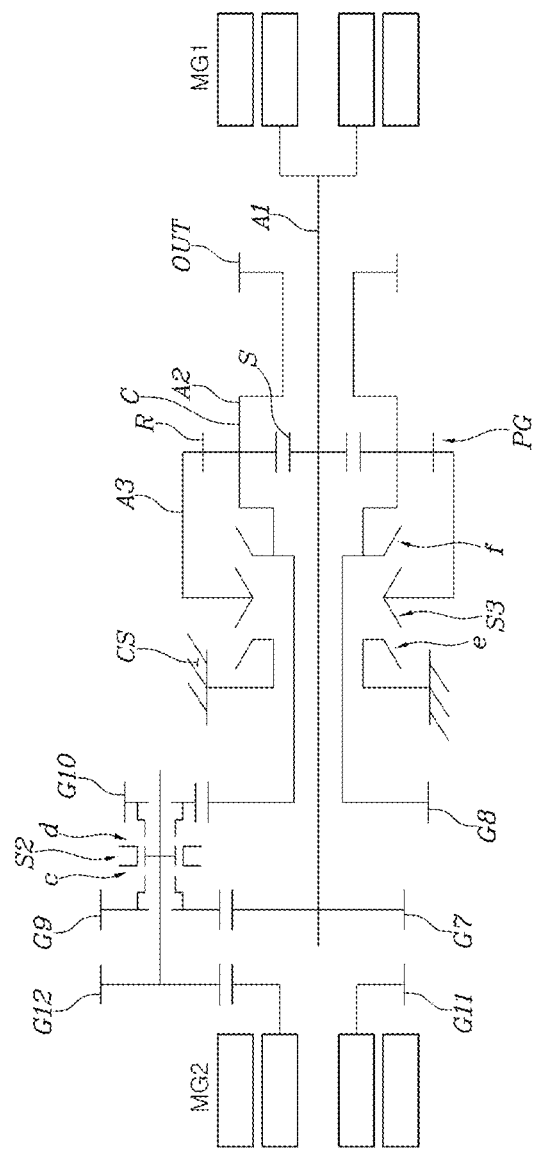
FIG. 6 is a diagram illustrating a fifth form of the powertrain for the electric vehicle according to one form of the present disclosure.

In the first to third forms, the first shift assembly S1 and the second shift assembly S2 are provided in common. In contrast, a fourth form of FIG. 5, a fifth form of FIG. 6, a sixth form of FIG. 8, and a seventh form of FIG. 9 are forms in which only one shift assembly similar to the first shift assembly S1 or the second shift assembly S2 is provided.

First, referring to the fourth and fifth forms, the two forms are configured in common to include: a planetary gear PG having three rotating elements, a first rotating element of which is connected to a first shaft A1, a second rotating element of which is connected to a second shaft A2, and a third rotating element of which is selectively connected to a transmission housing CS; a first motor MG1 installed to supply power to the first shaft A1 at all times; and a second motor MG2 installed to selectively supply power to the first shaft A1 and the second shaft A2.

Any two rotating elements of the three rotating elements of the planetary gear PG may be selectively connected to each other, such that the entire planetary gear PG can be rotated integrally.

The first rotating element of the planetary gear PG is a sun gear S, the second rotating element of the planetary gear PG is a carrier C, and the third rotating element of the planetary gear PG is a ring gear R.

A seventh gear G7 is installed on the first shaft A1 in a restrained state, and an eighth gear G8 is installed on the second shaft A2 in a restrained state. A ninth gear G9 in external engagement with the seventh gear G7 and a tenth gear G10 in external engagement with the eighth gear G8 are coaxially installed. The second motor MG2 is installed to be connected to the first shaft A1 and the second shaft A2 by the second shift assembly S2 install between the ninth gear G9 and the tenth gear G10.

The second shift assembly S2 includes a gear engagement unit in which a hub and a sleeve are provided on the rotating shaft of the ninth gear G9 and the tenth gear G10.

The second motor MG2 is coaxially installed on the first shaft A1, and power of the second motor MG2 is configured to be transmitted to the first shaft A1 or the second shaft A2 by an eleventh gear G11, which is coaxially installed on the first shaft A1, and a twelfth gear G12 that is in external engagement with the eleventh gear G11 and is coaxially installed on the ninth gear G9 and the tenth gear G10.

These forms are configured to include a third shift assembly S3 configured such that the third rotating element of the planetary gear PG is fixed to the transmission housing CS or is connected to the second shaft A2 by linear displacement following an axial direction of the first shaft A1.

Figure 7:
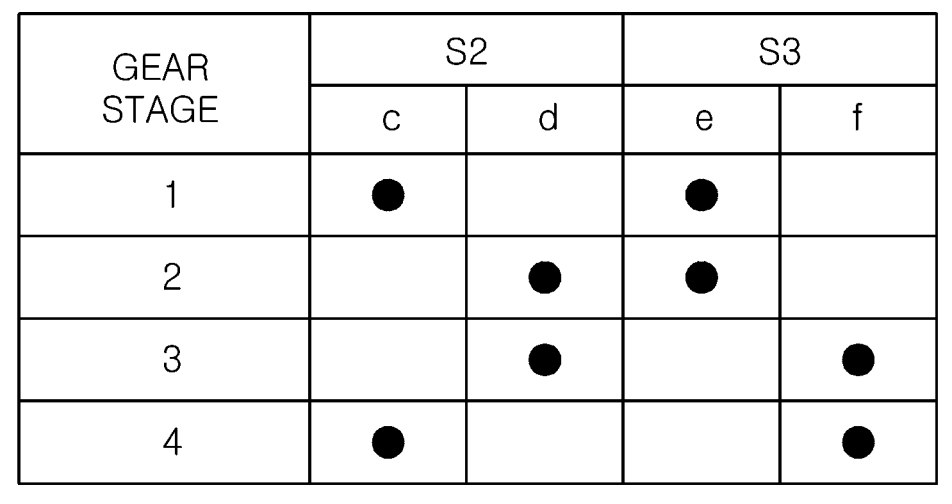

That is, the fourth and fifth forms are forms configured to use only the second shift assembly S2 of the first to third forms, are nearly similar to the first to third forms with regard to the other configuration and operations, and can realize a total of four gear stages as illustrated in FIG. 7.

Figure 8:
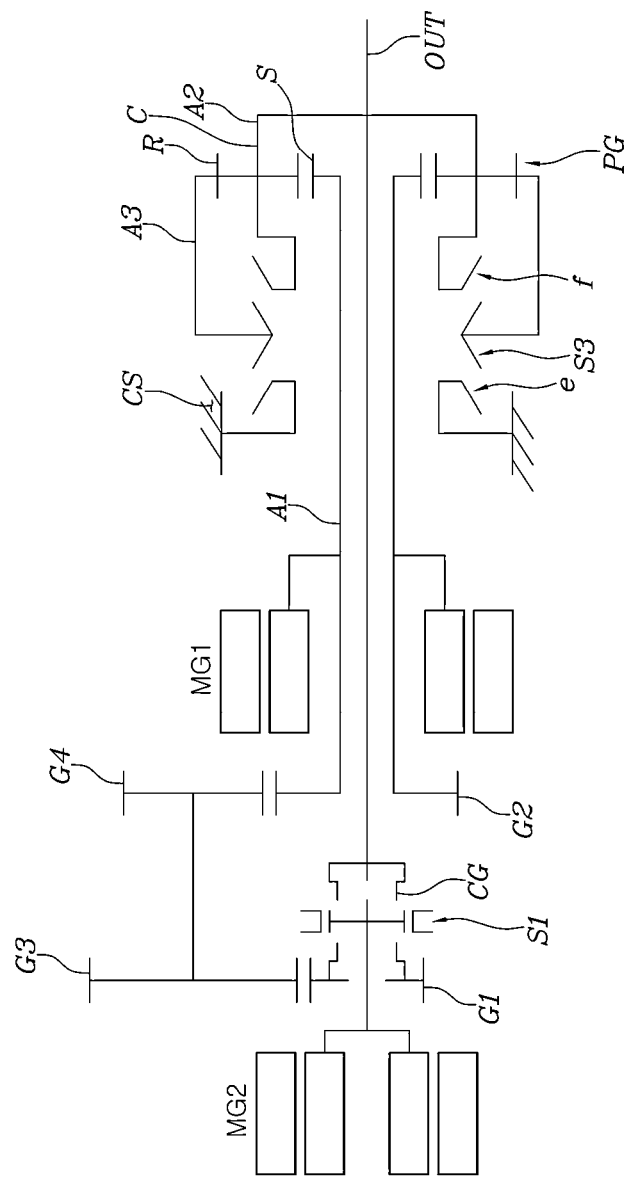
FIG. 8 is a diagram illustrating a sixth form of the powertrain for the electric vehicle according to one form of the present disclosure.
Figure 9:
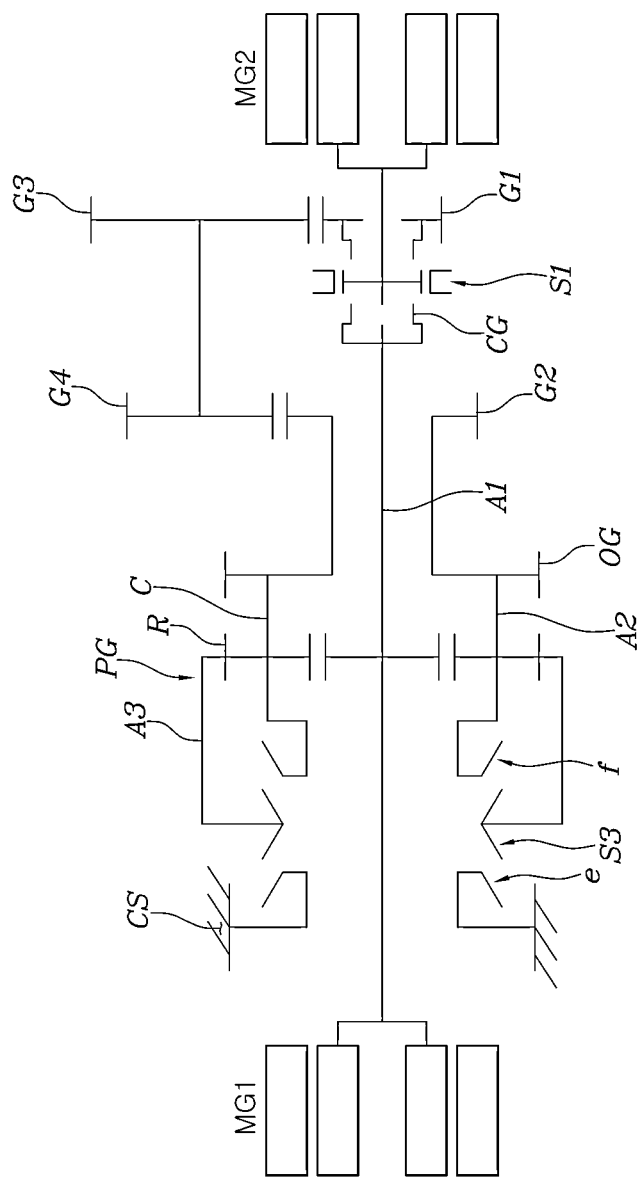
FIG. 9 is a diagram illustrating a seventh form of the powertrain for the electric vehicle according to one form of the present disclosure.

FIGS. 8 and 9 illustrate sixth and seventh forms of the present disclosure respectively, and include in common: a planetary gear including three rotating elements, among which a first rotating element is connected to a first shaft, a second rotating element is connected to a second shaft, and a third rotating element is connected to a third shaft; a first motor installed to supply power to the first shaft at all times; and a second motor installed to selectively supply power to the first and second shafts. The third shaft is fixably installed on a transmission housing, and any two shafts among the first, second, and third shafts are configured to restrain each other.

The first rotating element of the planetary gear is a sun gear, the second rotating element is a carrier, and the third rotating element is a ring gear.

In the sixth form of FIG. 8, a first shift assembly is provided between the second motor and the second shaft to switch between a state in which power of the second motor is directly transmitted to the second shaft and a state in which the power of the second motor is shifted by a gear train and is transmitted to the first shaft.

That is, the second motor is disposed such that a rotating shaft thereof is coaxial with the second shaft; the first shift assembly includes a gear engagement unit, a hub and a sleeve of which are provided on the rotating shaft of the second motor; a first gear including a clutch gear engageable with the sleeve of the gear engagement unit is rotatably installed on the rotating shaft of the second motor; the clutch gear engageable with the sleeve of the gear engagement unit is installed on the second shaft in a state in which rotation of the clutch gear is restrained; and a second gear installed on the first shaft to receive the power of the second motor in a state in which rotation of the second gear is restrained.

Further, a third gear engaged externally with the first gear and a fourth gear engaged externally with the second gear are coaxially connected to each other.

Therefore, in a state in which the sleeve of the first shift assembly S1 is moved to the left side in the drawing, the power of the second motor MG2 is transmitted to the first shaft A1 through the first gear G1, a third gear G3, a fourth gear G4, and the second gear G2 in turn. In a state in which the sleeve of the first shift assembly S1 is moved to the right side in the drawing, the power of the second motor MG2 can be transmitted to the second shaft A2 without a change.

In some forms of the present form, a third shift assembly S3 is provided. The third shift assembly S3 is configured such that the third rotating element of the planetary gear PG is fixed to the transmission housing CS or is connected to the second shaft A2 by linear displacement following an axial direction of the first shaft A1.

Meanwhile, in the seventh form of FIG. 9, a first shift assembly is provided between the second motor and the first shaft to switch between a state in which power of the second motor is directly transmitted to the first shaft and a state in which the power of the second motor is shifted by a gear train and is transmitted to the second shaft.

The second motor is disposed such that a rotating shaft thereof is coaxial with the first shaft; the first shift assembly includes a gear engagement unit, a hub and a sleeve of which are provided on the rotating shaft of the second motor; a first gear including a clutch gear engageable with the sleeve of the gear engagement unit is rotatably installed on the rotating shaft of the second motor; the clutch gear engageable with the sleeve of the gear engagement unit is installed on the first shaft in a state in which rotation of the clutch gear is restrained; and a second gear installed on the second shaft to receive the power of the second motor in a state in which rotation of the second gear is restrained.

Further, a third gear engaged externally with the first gear and a fourth gear engaged externally with the second gear are coaxially connected to each other.

Therefore, in a state in which the sleeve of the first shift assembly S1 is moved to the left side in the drawing, the power of the second motor MG2 is directly transmitted to the first shaft A1. In a state in which the sleeve of the first shift assembly S1 is moved to the right side in the drawing, the power of the second motor MG2 is transmitted to the second shaft A2 by shifting of the first gear G1, a third gear G3, a fourth gear G4, and the second gear G2.

In some forms of the present disclosure, a third shift assembly S3 is provided on the planetary gear PG. The third shift assembly S3 is configured such that the third rotating element of the planetary gear PG is fixed to the transmission housing CS or is connected to the second shaft A2 by linear displacement following an axial direction of the first shaft A1.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A powertrain for an electric vehicle, the powertrain comprising:

a planetary gear including a first rotating element, a second rotating element and a third rotating element, where the first rotating element is connected to a first shaft, the second rotating element is connected to a second shaft, and the third rotating element is selectively connected to a transmission housing;

a first motor configured to supply power to the first shaft at all times; and a second motor configured to selectively supply power to the first shaft and the second shaft, wherein two rotating elements among the first, second, third rotating elements of the planetary gear are selectively connected to integrally rotate the entire planetary gear, wherein:

a seventh gear is connected to the first shaft in a restrained state;

an eighth gear is connected to the second shaft in a restrained state;

a ninth gear in external engagement with the seventh gear and a tenth gear in external engagement with the eighth gear are installed coaxially with each other; and the second motor is installed to be connectable to the first shaft and the second shaft via a second shift assembly installed between the ninth gear and the tenth gear.

2. The powertrain of claim 1, wherein:

the first rotating element of the planetary gear is a sun gear;

the second rotating element of the planetary gear is a carrier; and the third rotating element of the planetary gear is a ring gear.

3. The powertrain of claim 2, further comprising: a third shift assembly configured to fix the third rotating element of the planetary gear to the transmission housing or connect the third rotating element of the planetary gear to the second shaft by linear displacement following an axial direction of the first shaft.

4. The powertrain of claim 1, wherein the second shift assembly includes a gear engagement unit, a hub and a sleeve of which are provided on a rotating shaft of the ninth gear and the tenth gear.

5. The powertrain of claim 4, wherein:

the second motor is coaxially installed on the first shaft; and power of the second motor is transmitted to the first shaft or the second shaft by an eleventh gear installed coaxially on the first shaft and a twelfth gear in external engagement with the eleventh gear to be coaxial with the ninth gear and the tenth gear.

* * * * *